United States Patent

Kanda et al.

[11] Patent Number: 5,910,118
[45] Date of Patent: Jun. 8, 1999

[54] REMOVAL OF CLUTTER COMPONENTS IN ULTRASOUND COLOR-DOPPLER IMAGING

[75] Inventors: Ryoichi Kanda; Eiichi Shiki, both of Otawara, Japan

[73] Assignee: Kabushiki Kaisha Toshiba, Kawasaki, Japan

[21] Appl. No.: 08/942,329

[22] Filed: Oct. 1, 1997

[30] Foreign Application Priority Data

Oct. 1, 1996 [JP] Japan ................................. 8-260805

[51] Int. Cl.$^6$ .................................................. A61B 8/06
[52] U.S. Cl. ............................................................ 600/455
[58] Field of Search .......................... 600/441, 454–456; 73/861.25

[56] References Cited

U.S. PATENT DOCUMENTS

| | | | |
|---|---|---|---|
| 4,961,427 | 10/1990 | Namekawa et al. | 600/455 |
| 5,107,841 | 4/1992 | Sturgill | 73/861.25 |
| 5,170,792 | 12/1992 | Sturgill et al. | 600/455 |
| 5,188,112 | 2/1993 | Sturgill et al. | 600/455 |
| 5,190,044 | 3/1993 | Kawasaki et al. | 600/455 |
| 5,197,477 | 3/1993 | Peterson et al. | |
| 5,349,524 | 9/1994 | Daft et al. | |
| 5,357,965 | 10/1994 | Hall et al. | 600/454 |
| 5,383,464 | 1/1995 | Shiba | 600/455 |
| 5,483,962 | 1/1996 | Shiba | 600/455 |
| 5,609,155 | 3/1997 | Guracar | 600/455 |

FOREIGN PATENT DOCUMENTS

2-49644  2/1990  Japan.
6-254095  9/1994  Japan.

*Primary Examiner*—Francis J. Jaworski
*Attorney, Agent, or Firm*—Oblon, Spivak, McClelland, Maier & Neustadt, P.C.

[57] ABSTRACT

An ultrasound imaging apparatus and method in which an ultrasound signal is transmitted a plurality of times in each scanning direction and its echo is received. A Doppler signal detected from a group of echo signals consisting of a train of sequential Doppler data for each spatial sample position in each scanning direction. The amount of instantaneous changes in a phase of a clutter component included in the Doppler signal is estimated, the clutter component occurring due to reflection of the ultrasound signal from an organ. A phase of the Doppler signal is corrected using the estimated amount of instantaneous changes in the phase. A constant value corresponding to the clutter component is subtracted from the Doppler signal of which phase is corrected, information representing a blood flow is extracted based on the Doppler signal of which clutter component is removed and the extracted information is displayed in color.

19 Claims, 8 Drawing Sheets

PROFILE OF POWER
ACROSS A BLOOD VESSEL
AND ITS PROXIMATE
PORTION

REMOVAL OF CLUTTER COMPONENTS IN ULTRASOUND COLOR-DOPPLER IMAGING

BACKGROUND OF THE INVENTION

The present invention relates to ultrasound color-Doppler imaging producing in color dynamic information of blood flows within a living body utilizing an ultrasound color-Doppler technique and, in particular, relates to improvement in performance of a filter incorporated to remove clutter components made up of reflections from organs such as the cardiac muscle.

An ultrasound color-Doppler technique utilizes the Doppler effect of ultrasound to non-invasively acquire information concerning dynamics of blood flowing in an object from the outside thereof. Diagnostic ultrasound apparatus capable of executing this technique have advanced remarkably.

One type of diagnostic ultrasound apparatus is known as an apparatus performing a color-Doppler tomography (also referred to as color flow mapping (CFM)). The color-Doppler tomography, based on an MTI (moving target indication) technique which has been used in a field of radar systems, can obtain two-dimensional mapping images of blood velocities in a cross section of an object.

In order to make such velocity mapping images, an ultrasound echo is detected from an object responsively to the transmission of an ultrasound pulse and is converted into an electric signal, before it is branched into a real part signal and an imaginary part signal. Each of the real part and imaginary part signals is phase-detected against a reference signal by an orthogonal phase detector, thereby providing Doppler signals indicative of changes in phase against the reference signal. The real part and imaginary part signals composing a Doppler signal are each digitized by A/D converters and temporarily stored in each buffer memory.

For the CFM mode instructing color flow mapping, an ultrasound pulse is transmitted and received a plurality of times N (for example, 16 times) along the same scanning direction. Digital data necessary for the reconstruction of one CFM image become a three-dimensional volume data having the first to third directions for each of the real part and imaginary part signals and stored in a buffer memory of an MTI filer. The first direction corresponds to the number of each scanning line, the second one the number of pixels existing in each scanning line in its depth direction, and the third one the number of Doppler data obtained by repeating the transmission and reception of an ultrasound pulse.

In this three-dimensional volume data, the same pixel position in a scanned cross section has temporally sequential reception echoes in digital quantities, which are acquired by repeating N-times the transmission of an ultrasound pulse and the reception its echo, phase-detected, and mapped in the third direction. Velocities of changes of a signal represented by data aligned in the third direction indicate values of Doppler shift frequencies corresponding to travel velocities of an object to be imaged.

For the three-dimensional digital data (a group of Doppler signals) stored in the buffer memories of the MTI filter, clutter components are removed at each pixel position every data train aligned in the third direction, on the principle described below.

Received echoes are mixed signals of echo signals reflected from targets which move at velocities of a certain value or more, such as blood cell and echo signals (referred to as clutter components) reflected from tissues such as organs. In terms of signal intensities of echoes, clutter components are larger than blood flows, while in terms of travel velocities of echoes, blood flows are larger than clutter components. Thus a filtering circuit placed in the MTI filter is formed into a high-pass filter and its cut-off frequency is set to a limit at which clutter components are cut off. By this filtering configuration, clutter components are removed from a phase-detected Doppler signal, and echo signals reflected from blood flows are extracted.

The echo signal thus-extracted then undergoes estimation of motion states of blood flows (including blood flow velocities, power, and dispersion) and two-dimensional tomographic images are produced on the estimated information.

Although the conventional MTI filter has been used to remove clutter components in this way, it has not necessarily been satisfactory for removal of clutter components; that is, the conventional MTI filter lacks accuracy and high levels of the removal. This is because the actual organs are in slight motion or happen to move due to various reasons. Clutter components cased by such motion are difficult to clearly be distinguished from the blood flows of slower velocities.

The organs are in motion or tend to move by (1) the beats of the heart (in particular, this becomes a problem when diagnosing blood flows in the heart), motions of surrounding organs depending on shocks from the heart beat, (3) breathing of a patient (body motion), (4) the hand motion of an examining operator, and others.

When setting lower cut-off frequencies of the MTI filter clutter components will not be fully removed, leaving the remaining of the clutter components in the phase-detected signal. In this case, images for motion information of blood flows include the mixed remaining of the clutter components mixed. This results in lowered accuracy of diagnosis of blood flows and there is a problem of misdiagnosis.

In contrast, when setting the cut-off frequency at higher values, most clutter components can be removed steadily, but at the same time, part or most of echo signal components reflected from blood flows are removed. Particularly it is considered that blood flows having lower motion velocities will disappear from the monitor screen. Such images will no longer provide useful information for the diagnosis.

As understood from the above, the removal of clutter components and the extraction of echo signals from blood flows are mutually conflicted on requirements for the cut-off characteristics of signal components. Additionally the blood flow velocities vary with portions to be diagnosed and may vary person to person. In consideration with those conditions, the cut-off frequency of the MTI filter is obliged to be set at compromise values. In consequence, it is difficult for the conventional MTI filter to provide the full removal of clutter components, therefore being compelled to accept such a lower detectability for blood flowing at lower motion velocities.

The present invention has been made in consideration with the above problems posed by the conventionally-used MTI filter. An object of present invention is to provide a diagnostic ultrasound apparatus capable of distinguishing echoes reflected from blood flows of extremely lower velocities from clutter components in a steady and accurate manner, thus producing two-dimensional-mapped blood flow images of higher detectability by steadily removing clutter components caused by organs in motion and by detecting blood flows of extremely lower velocities without fail.

SUMMARY OF THE INVENTION

In order to achieve the object, as one aspect of the invention, there is provided an ultrasound color-Doppler apparatus comprising transmitting/receiving means for transmitting an ultrasound signal a plurality of times in each scanning direction composing a cross section to be imaged of an object and receiving an ultrasound echo reflected from along the cross section of the object, and means for detecting a Doppler signal from a group of echo signals made up of the ultrasound echo received at each time of the plurality of times of the transmission. The Doppler signal consists of a train of sequential Doppler data resulting from each spatial sample position in each scanning direction. According to the invention, the apparatus further comprises means for removing a clutter component from the Doppler signal using a characteristic inherently associated with the Doppler signal, the clutter component occurring due to reflection of the ultrasound signal from an organ in the cross section, means for extracting information representing a blood flow passing the cross section based on the Doppler signal of which clutter component is removed by the removing means, and means for displaying the extracted information.

Preferably, the displaying means is means that displays the information in color.

Still preferably, the removing means comprises means for estimating an amount of instantaneous changes in a phase of the clutter component included in the Doppler signal, and means for correcting a phase of the Doppler signal using the estimated amount of instantaneous changes in the phase. In this case, by way of example, the removing means comprises means for subtracting a constant value corresponding to the clutter component from the Doppler signal of which phase is corrected by the correcting means. By way of another example, the estimating means is means for estimating the amount of instantaneous changes in the phase using only part of the train of Doppler data. As an example, the estimating means is means for estimating the amount of instantaneous changes in the phase by performing a calculation including complex conjugate multiplication for temporally contiguous Doppler data employed as the part of the train of Doppler data.

It is also preferred that the removing means comprises a filter for filtering with changeable cut-off characteristics the Doppler signal and means for controlling the cut-off characteristics in agreement with characteristics of the Doppler signal.

As another aspect of the present invention, there is a method of ultrasound imaging, comprising the steps of transmitting an ultrasound signal a plurality of times in each scanning direction composing a cross section to be imaged of an object and receiving an ultrasound echo reflected from along the cross section of the object; detecting a Doppler signal from a group of echo signals made up of the ultrasound echo received at each time of the plurality of times of the transmission, the Doppler signal consisting of a train of sequential Doppler data resulting from each spatial sample position in each scanning direction estimating an amount of instantaneous changes in a phase of a clutter component included in the Doppler signal, the clutter component occurring due to reflection of the ultrasound signal from an organ in the cross section correcting a phase of the Doppler signal using the estimated amount of instantaneous changes in the phase subtracting a constant value corresponding to the clutter component from the Doppler signal of which phase is corrected by the correcting means; extracting information representing a blood flow passing the cross section based on the Doppler signal of which clutter component is removed and displaying the extracted information.

Therefore, according to removal of, for example, an amount of instantaneous changes in a phase of a clutter component included in the Doppler signal, echoes reflected from blood flows of extremely lower velocities are distinguishably detected from clutter components in a steady, stable and accurate manner, thus producing two-dimensional-mapped blood flow images of higher detectability.

The remaining features of the invention will be clearly understood from the following description of preferred embodiments, described together with accompanying drawings.

DESCRIPTION OF THE PREFERRED EMBODIMENTS

A first embodiment of the present invention will now be described in conjunction with FIGS. 1–9.

Figure 1:
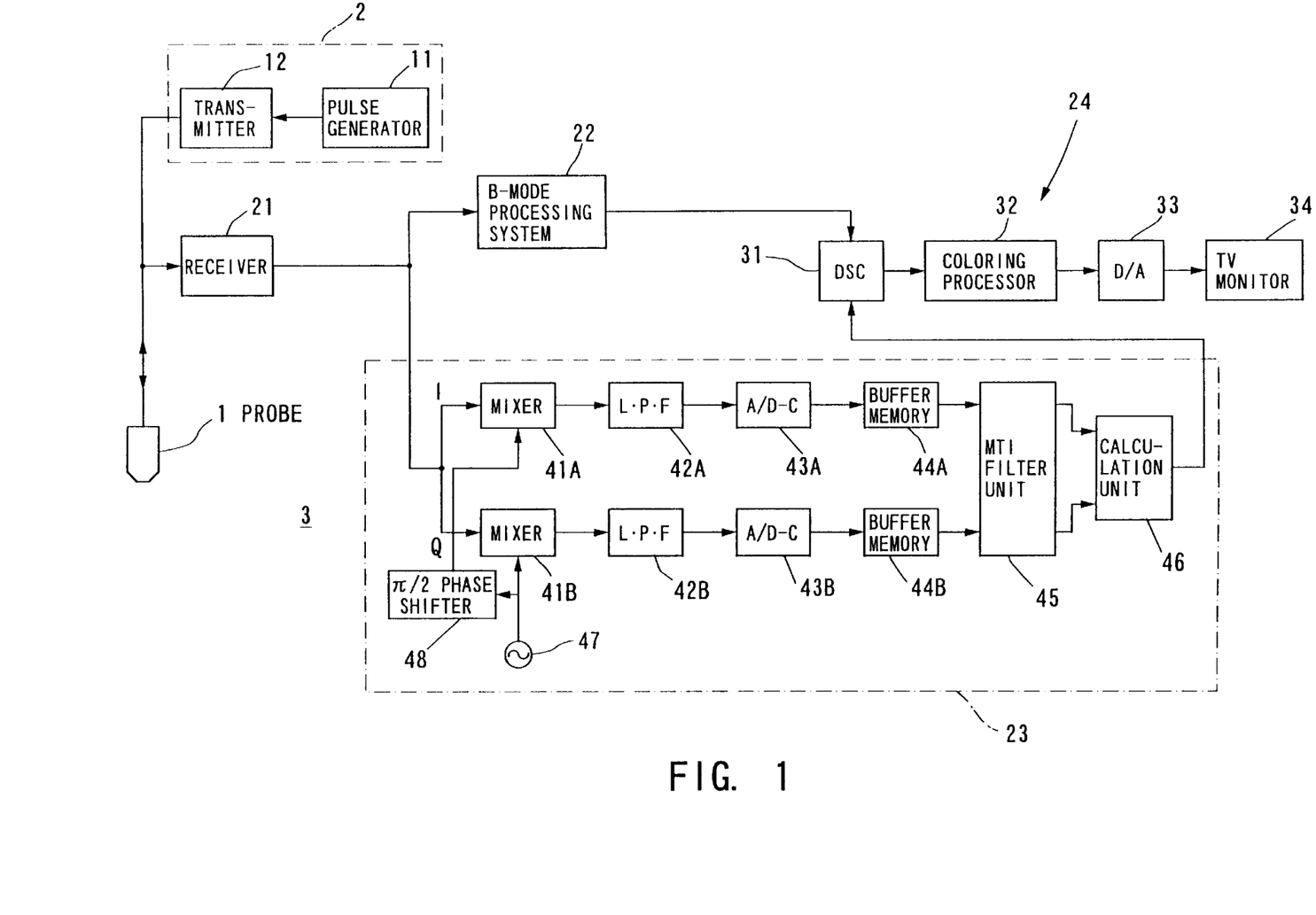
FIG. 1 is a block diagram showing a diagnostic ultrasound color-Doppler apparatus according to embodiments of the present invention.

A diagnostic ultrasound apparatus shown in FIG. 1 comprises an ultrasound probe 1 bilaterally signal-changing between an ultrasound signal and an electric signal and transmitting system circuits 2 and receiving/processing system circuits 3 both connected with the probe 1.

The ultrasound probe 1 comprises an array type of piezo-electric transducer arranged at the tip thereof. The transducer has a plurality of piezoelectric elements arranged in an array and arranged in is a scanning direction. For example, each piezoelectric element is used for one channel of transmission and reception.

The transmitting system circuits 2 include a pulse generator 11 generating a reference rate pulse, and a transmitter 12 outputting driving pulses by delaying the reference rate pulse channel by channel. The driving pulses outputted from the transmitter 12 are supplied for every channel to the plurality of transducers of the probe 1. Transmission delay times given to the driving pulses are controlled for every channel and repeatedly supplied at each time instance defined by a rate frequency. In response to the driving pulses supplied an ultrasound pulse is radiated from each transducer. The ultrasound pulses travel into an object with a transmitting beam formed according to the controlled transmission delay times, and they are partially reflected at boundaries of which acoustic impedance changes, thus providing echoes. The reflected echoes are partially or almost received by the transducers and converted into corresponding electric signals therein.

The receiving/processing system circuits 3 include, in addition to a receiver 21 connected to the probe 1, a B-mode processing circuit 22, a CFM-mode processing circuit 23, and a display circuit 24. The receiver 21 has pre-amplifiers connected every channel to the transducers, delay circuits connected to the pre-amplifiers, and an adder adding delayed outputs from the delay circuits (not shown). For this configuration, echoes received by the probe 1 are provided to the receiver 21 as corresponding analog electric signals, amplified channel by channel, delay-controlled for beamforming in reception, and added with each other. As a result, a reception beam is formed on calculation, the focus of which is determined by the reception delay times and the directivity of which becomes desired one.

The output of the receiver 21 is branched into the B-mode and CFM-mode processing circuits 22 and 23. The B-mode processing circuit 22 is in charge of producing B-mode gray-scale tomographic data, and is provided with a logarithmic amplifier, envelope detector, and A/D converter (not shown). Thus an echo signal beamformed in the receiver 21 is logarithm-amplified by the logarithmic amplifier, envelope-detected by the envelope detector, and digitized by the A/D converter. The digitized signal is sent to displaying system circuits 24 as a B-mode image signal.

The displaying circuits 24 include a digital scan converter (DSC) 31 comprising frame memories for B-mode and CFM mode and writing/reading control circuit, a coloring processor 32 providing pixels color information, a D/A converter 33, and a TV monitor 34 for display. The envelope-detected signal from the B-mode processing circuit 22 is then written into a B-mode frame memory of the DSC 31.

The CFM-mode processing circuits 23 are placed for producing CFM-mode image data which represent dynamics blood flows. The circuits 23 are branched into two systems of a real part Q and imaginary part I both receiving the echo signal from the receiver 21. For each of the real part Q and imaginary part I, there are provided a mixer 41A(41B), LPF 42A(42B), and A/D inverter 43A(43B) in this order from their inputs. Furthermore the CFM-mode processing circuits 23 are provided with buffer memories 44A(44B) temporarily storing processed signals for the real and imaginary parts converted by the A/D converters 43A and 43B, an MTI filter unit 45 filtering the stored signals in the buffer memories, and a calculation unit 46 calculating various parameters regarding with dynamics of blood flows on the basis of the outputs from the MTI filter unit 45. The circuits 23 are further provided with a reference oscillator 47 oscillating a reference signal and a phase shifter 48 providing an exact phase difference of 90 degrees to the reference signal and sending the shifted reference signal to the mixer 41A. The reference oscillator 47 operates in synchronism with the pulse generator 11 of the transmitting system circuits 2. The reference signal is in frequency equal or substantially equal to the ultrasound signal employed herein.

In each of the real and imaginary part systems, an echo signal outputted from the receiver 21 is multiplied by the reference signal in the mixer 41A(41B) and higher components are removed by the LPF 42A(42B), thus forming a baseband signal. Namely, the echo signal is phase-encoded (orthogonal phase detection) by a combination of the mixer 41A(41B) and the LPF 42A(42B) at each of the real and imaginary part systems, providing a Doppler signal of the baseband reflecting phase differences from the reference signal. The Doppler signal is then converted into digital data by the A/D converter 43A(43B) and temporarily stored in the buffer memory 44A(44B).

The MTI filter unit 45 is placed for removing unnecessary echo components reflected from the wall of the cardiac muscle and others using a group of data stored in the buffer memories 44A and 44B. The processing carried out in the MTI filter unit 45 achieves the filtering according with the present invention. By the MTI filter unit 45, Doppler components from organs (hereinafter, referred to as clutter components) are removed accurately and steadily from the whole Doppler signal, providing a signal substantially made up of only Doppler components reflected from blood flows.

After being filtered in the MTI filter unit 45, Doppler data for the real and imaginary parts are sent to the calculation unit 46. The circuit 46 has, for example, an auto-correlation calculator estimating dynamics of blood flows using the Doppler data for the real and imaginary parts, and an average velocity calculator, dispersion calculator, and power calculator to estimate information concerning the average velocities of blood flows, the dispersion of velocity distributions, the values of power of reflected signals from blood flows, and others, respectively. The resultant information is temporarily stored in the CFM frame memory of the DSC 31 as CFM-mode image data.

In the DSC 31, image data stored in the B-mode and CFM-mode frame memories are individually read in the standard TV system. Concurrently with the read-out, either one of the same pixel positions in both the frame memories is selected to form one frame of image data in which CFM-mode image data are superimposed on B-mode image data (background image data). The superposition data are then given color data by the coloring processor 32, converted into analog signals by the D/A converter 33 at every given period, and displayed on the TV monitor 34. In consequence, a two-dimensional color image of blood flows is displayed with a black/white B-mode background image.

Figure 2:
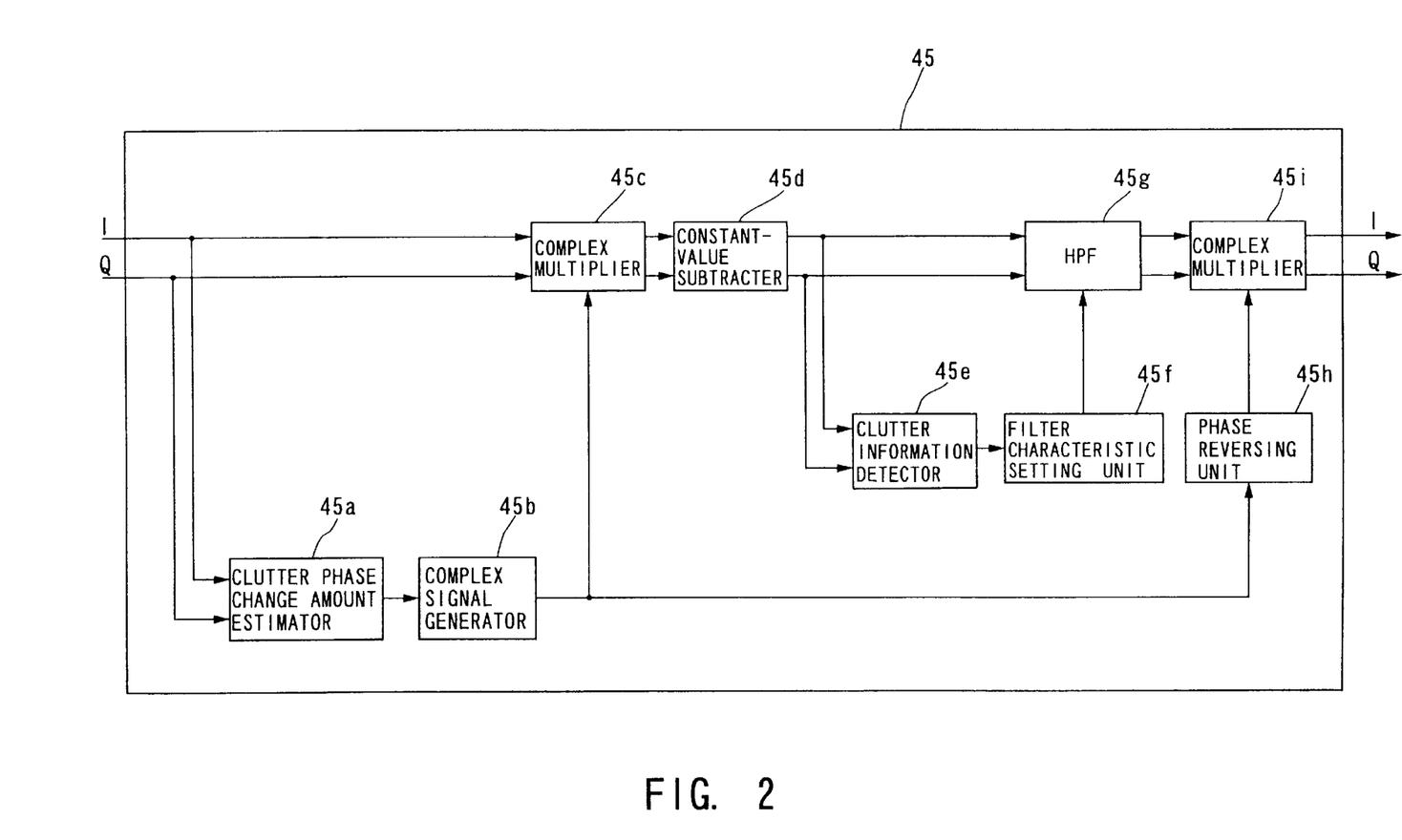
FIG. 2 is a block diagram of an MTI filter unit in a first embodiment.

The configuration and operation of the MTI filter unit 45 will now be given, together with the principle of filtering in the present invention.

Figure 3:
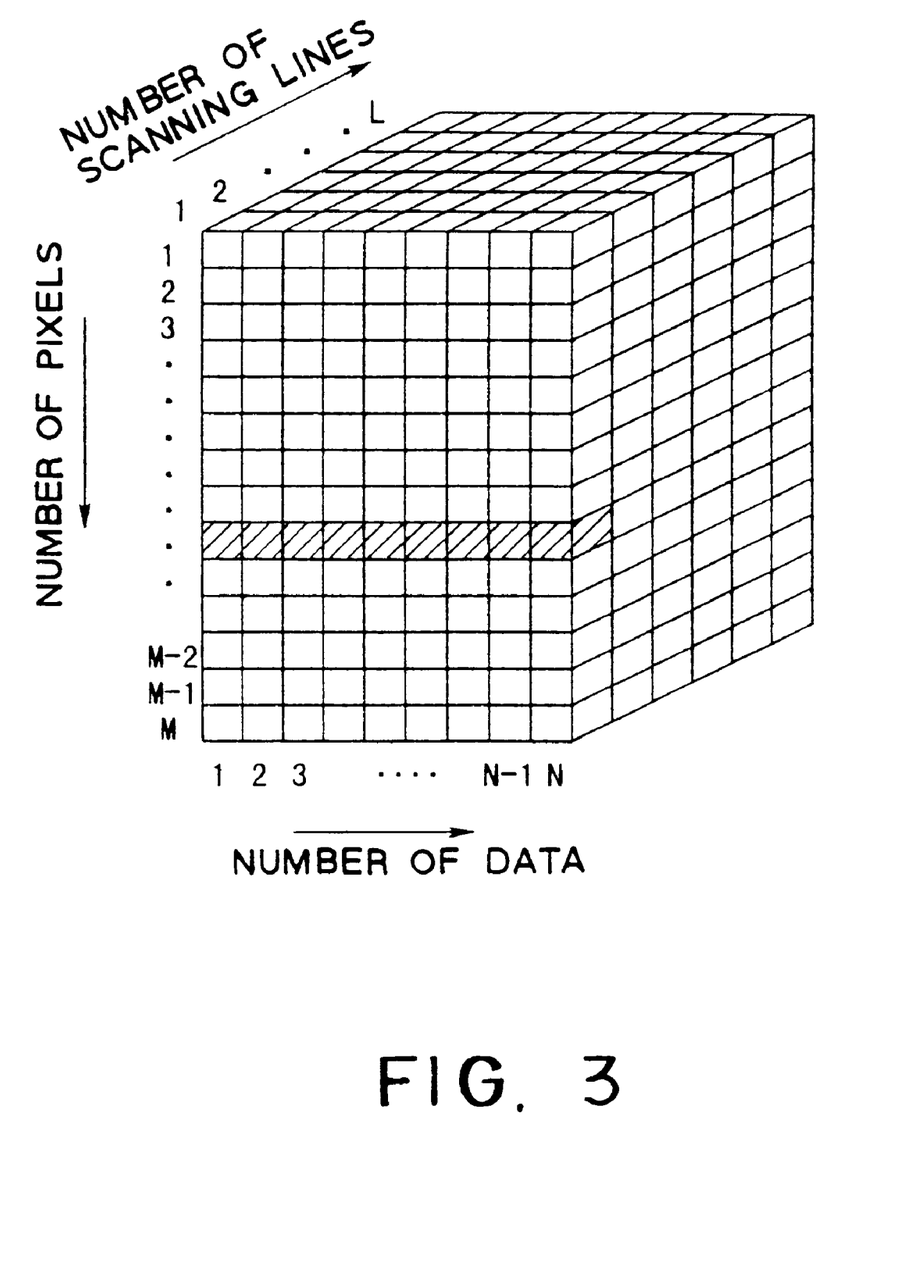
FIG. 3 represents a pictorial explanation for a three-dimensional volume of echo data obtained in the CFM mode by repeating a plurality of times of transmission and reception of an ultrasound pulse along the same cross section of an object.

In order to produce CFM-mode images, an ultrasound pulse is transmitted and received a plurality of times (for example, 16 times) along the same scanning line direction. An echo signal acquired by one time of the transmission and reception is phase-detected and stored in each of the buffer memories 44A and 44B. Hence, a group of digital phase-detected data stored in each of the buffer memories 44A and 44B becomes a three-dimension as shown in FIG. 3. In the figure, the first direction represents the number 1-L of scanning lines, the second direction the number 1-M of pixels residing in the depth direction along each scanning line, and the third direction the number 1-N of data at each pixel acquired by repetition of the transmission and reception along each scanning line. Hereinafter, the number 1-N of data is referred to as the number of data. In the case of CFM-mode, N pieces of Doppler data aligned time-sequentially for each pixel (refer to a obliquely-lined portion in FIG. 3) are independently processed to provide information of dynamics of blood flows for each pixel.

Figure 4A:
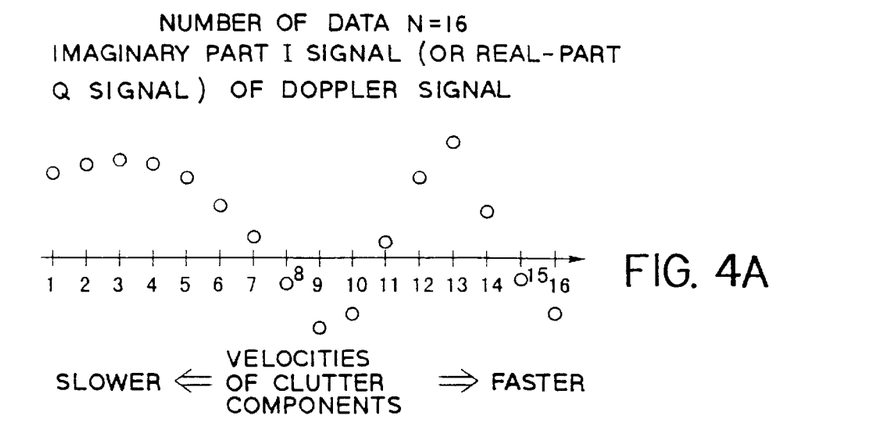
FIGS. 4A to 4C are discrete wave forms of trains of Doppler data (Doppler signal) obtained at the same pixel position.
Figure 4B:
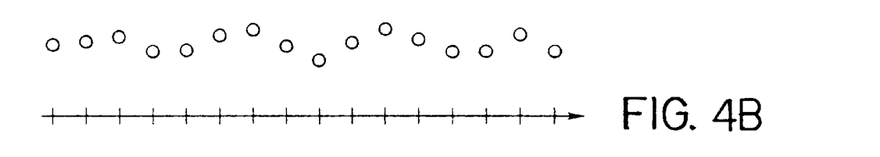
Figure 4C:
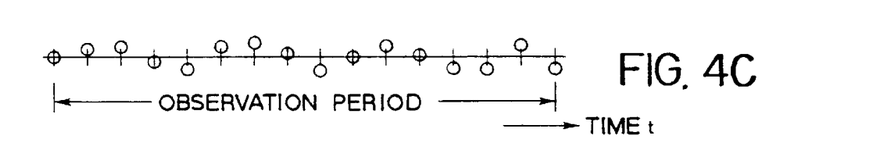

Therefore, as shown in FIGS. 4A–4C, provided to the MTI filter unit 45 from the buffer memories 44A and 44B are digital Doppler signals $Z_i$(i=0 to N−1) for the real and imaginary parts, respectively. In FIGS. 4A–4C, the longitudinal direction represents amplitudes of the signals.

Operational features of the MTI filter unit 45 are summarized into the following four items.

(1) Changes in the instantaneous phase of clutter components between contiguous Doppler data are estimated and based on the estimated amounts, the whole Doppler signal for each pixel is phase-corrected (i.e., instantaneous phase changes of the clutter components are cancelled out). In the present invention, the term "spontaneous" is used to express a shorter period than the whole observation period of N pieces of Doppler data.

(2) After correction in the above item (1), clutter components are removed by subtracting a value corresponding to a certain amplitude from the Doppler signal.

(3) After correction in the above item (1) or (2), high-pass filtering is executed to remove clutter components. The characteristics of the high-pass filtering are changed in association with the outputs of processing in the above item (2).

(4) When necessary, influences of phase variations caused by processing in the above item (1) are cancelled and information concerning blood velocities is provided in agreement the velocity concept which has been used conventionally.

In the following, for the sake of simplification, the explanation is given to a single train of N-piece digital Doppler data forming a Doppler signal which comes from a certain single pixel point in a scanned cross section. (The Doppler signal corresponds to the oblique-lined portion in FIG. 3.) A plurality of trains of N-pieces digital Doppler data at each of the remaining pixel points are subject to the same processing as the above.

In realizing the feature (1), as shown in FIG. 2, the MTI filter unit 45 includes at its input side a clutter phase change amount estimator 45a and complex multiplier 45c each receiving Doppler signals $Z_1$ of the real and imaginary parts, and a multiplication signal generator 45b receiving the estimation signal from the clutter phase change amount estimator 45a. The multiplication signal generated by the generator 45b is supplied to the complex multiplier 45c. Also to attain the feature (2), there is a constant-value subtracter 45d to subtract a constant value from each of the Doppler signals of the real and imaginary parts supplied from the complex multiplier 45c.

For the features (1) and (2), the principle explanation will be given. Each train of Doppler data (Doppler signal) at each pixel position consists of discrete Doppler data of N-pieces as illustrated in FIG. 4A. The one train of Doppler data can be expressed as the following equation (1), in which the whole data are divided into a Doppler signal data (clutter components) reflected from the organs and a Doppler signal data reflected from blood flows:

$$Z_i = A \cdot exp\{j \cdot (\phi_i + \phi_0)\} + a \cdot exp\{j \cdot (\phi_i + \psi_0)\} \quad (1)$$

In equation (1), the first term indicates the clutter components and the second term indicates the Doppler signal from flows of blood. "A" indicates an amplitude of the clutter components and "a" indicates an amplitude of the Doppler signal from blood flows. In general, their amplitudes holds a relation of A>>a. FIG. 4A exemplifies a wave form of the Doppler signal, wherein the motion velocities of clutter components are faster in its earlier stage and faster in its later stage. The subscripts i express the number of data (O to N−1) of the Doppler signal, $\phi_o$ and $\psi_o$ are the initial phases of the Doppler data, and $\phi_1$ and $\psi_1$ are phase differences of i-th Doppler data from the O-th Doppler data.

The phase terms of the Doppler signals for the clutter components and blood flows can be written as follows, when supposing that both the frequencies of the Doppler signals are constant:

$$\phi_i = 2\pi \cdot f_{cl} \cdot Tr \cdot i \quad (2a)$$

$$\psi_i = 2\pi \cdot f_b \cdot Tr \cdot i \quad (2b)$$

where $f_{c1}$ and $f_b$ are average Doppler shift frequencies over an observation period of Doppler signals from the clutter components and blood flows, respectively. $T_r$ is a repetition period of transmitting/receiving an ultrasound pulse along the same scanning line.

However, the frequency (Doppler frequency) of a Doppler signal from clutter components is not usually constant during an observation period. For this reason, when using phase values obtained from the above equation (2a) which is based on an assumption that phase changes are constant at any time, it is difficult to fully cancel out changes in phases of clutter components during the observation period. Hence the present invention requires calculation of phase estimation in consideration with "instantaneous changes in phase during an observation period." If the frequency of clutter components is constant during an observation period, the instantaneous changes in phases of clutter components are no longer impossible to be cancelled out.

Therefore for removing clutter components included in the phase-detected Doppler signal, each data $Z_i$ (i=0,1,2, . . . , N−1) of the Doppler signal undergoes the processing based on the following equation which combines a phase correction operation and a constant-value subtraction operation.

$$Z_i \cdot exp\{-j \cdot (\phi_i)\} - A \cdot exp\{j \cdot (\phi_0)\} = a \cdot exp\{j \cdot \{(\psi_i - \phi_i) + \phi_0\}\} \quad (3)$$

Ideally, performing this processing will result in removal of the clutter components and acquisition of only the Doppler signal from blood flows. To achieve the performance in an ideal state or a nearly ideal state, it is very important how accurately the phase term of clutter components is estimated. Various estimation techniques of the phase $\phi_i$ term are as follows.

First of all, an auto-correlation technique is usable as a simple manner (but the present invention does not employ this technique). The auto-correlation is generally defined by the following equation and provides an average frequency over an observation period in which the number of data is N:

$$\overline{f_d} = (2\pi Tr)^{-1} \tan^{-1}\left[\sum_{i=0}^{N-2} S_{i+1} S_i^*\right] \quad (4)$$

where $S_i$ is a Doppler signal outputted from the MTI filter unit and "*" represents the complex phase conjugate.

However since the velocities of clutter components are not always constant during an observation period, employing one average frequency value over the entire observation period will lower the removal ability of clutter components expressed by equation (3). Therefore, the auto-correlation technique is excluded from the scope of the present invention.

In the present invention, the instantaneous changes in phase of clutter components are detected to correct the Doppler signal with the detected instantaneous changes. By the correction, velocity changes in clutter components are corrected instantaneously to provide a Doppler signal with no or almost no changes in phase of clutter components. To achieve this, in the present invention, phase change amounts are averaged every shorter period and estimated. Estimation itself for phase change amounts between contiguous data in a Doppler signal is carried out based on multiplication of complex conjugate between the data likewise as in the foregoing auto-correlation. Additionally the various improved methods are proposed to raise the stability of the estimation.

The first averaging method, which includes complex calculation similar to the estimation of an average frequency based on the above auto-correlation, is shorter in an average width for complex multiplication than an observation period, and instantaneous change amounts in phase can be estimated. While the foregoing auto-correlation produces only one phase correction value during the observation period (N-pieces of data), using the first averaging method produces N−1 pieces of phase correction values. The first averaging method is quantitatively expressed as follows. Phase change values of clutter components between i-th and "i+1"-th data are expressed as follows using a few neighboring data:

$$\theta_i = \tan^{-1}\left[\sum_{ii=i-I}^{i+I} Z_{ii+1}Z_{ii}^*\right] \qquad (5)$$

In this equation, an averaging width "2×I+1" is small enough compared with the number N of data and selected such that it traces transition of phase change amounts of clutter components at satisfactory speeds. In the ends of the train of Doppler data, the averaging width is narrowed gradually and at the end points, the averaging width is set to 1. Thus even at the end points, the phase change values can be outputted. The averaging width is not necessarily limited to odd numbers like in equation (5), but even numbers can be used.

The second averaging method is a technique that changes the orders of processing in equation (5). More specifically, averaging is done like:

$$\theta_i = \{1/(2I+1)\}\sum_{ii=i-I}^{i+I} [\tan^{-1}(Z_{ii+1}Z_{ii}^*)] \qquad (6)$$

In this case, the averaging width "2I+1" is set to a value small enough compared with the number N of data. Furthermore in or at the end positions of the train of Doppler data, the averaging will be done in the same as the first averaging method.

The third averaging method is used to obtain phase change amounts in sequence between contiguous data on the basis of the equation (7):

$$\theta_i = \tan^{-1}(Z_{i+1}Z_i^*) \qquad (7)$$

Figure 5:
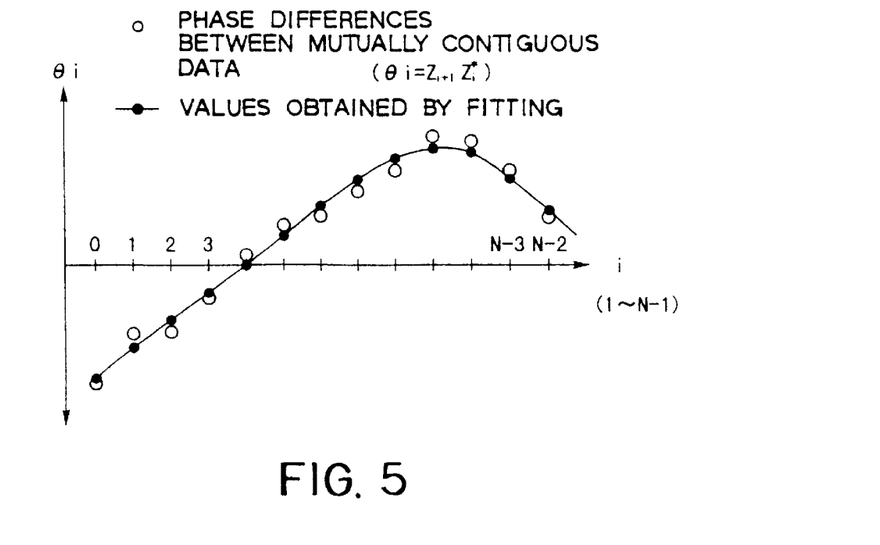
FIG. 5 explains one estimation manner of amounts of phase correction.

Obtained phase correction values undergo fitting of smoother curves by a least square technique, providing a plurality of finalized phase correction values, as pictorially illustrated in FIG. 5.

The estimation of phase change amounts of clutter components based on the above averaging manners uses the input signal into the MTI filter unit, that is, the phase-detected signal in which the Doppler signal from blood flows and clutter components are mixed. In other words, it is not limited that only clutter components are used. However clutter components are in amplitude large enough compared with Doppler signals from blood flows. For this reason, in most cases, it can be regarded that phase change amounts estimated from the input signal to the MTI filter unit are approximately equal to those of clutter components.

Figure 6A:
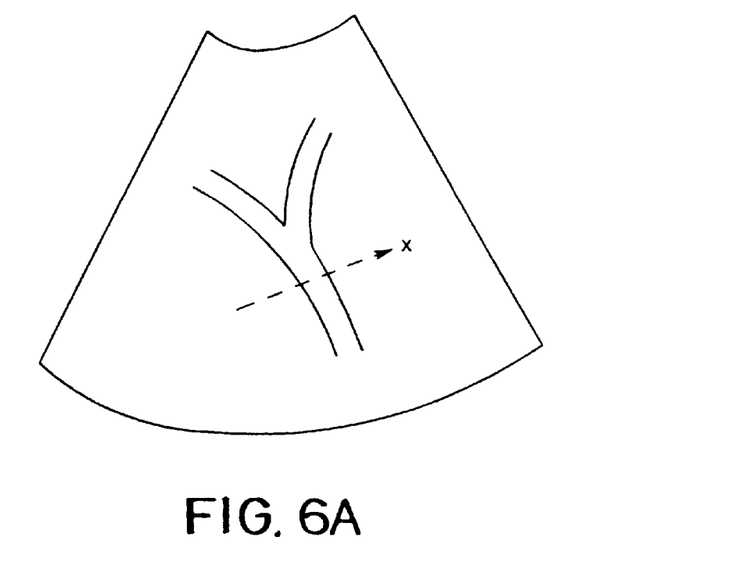
FIGS. 6A and 6B explain a state in which clutter components are bleeding inside a blood vessel of large diameter.
Figure 6B:
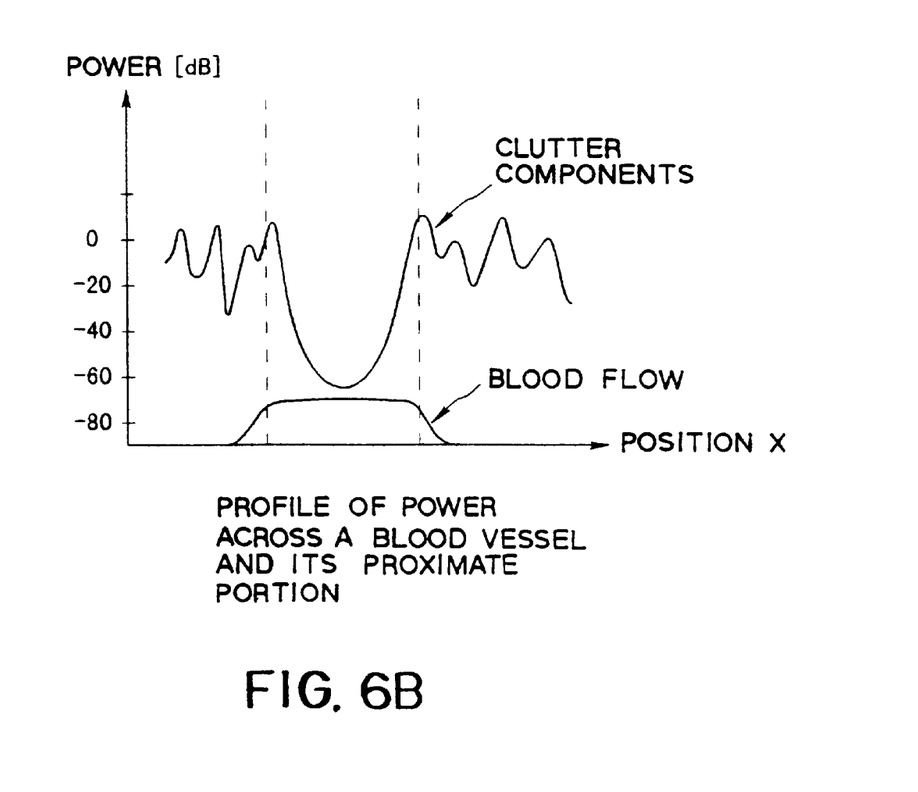

In some cases, however, such postulate cannot be applied, especially when blood vessels becomes relatively thicker. In general, the spatial characteristics of ultrasound signals have bleeding according to its spatial spread. This bleeding is true of blood vessels, and clutter components bleeds inside the blood vessels. When blood vessels are thin, the foregoing postulate is accomplished, since the bleeding of clutter components becomes a relatively large proportion. In contrast, there are cases that the thicker the blood vessels, the less the bleeding of clutter components into the center of their blood vessels as shown in FIGS. 6A and 6B. In those cases, there may be particular situations that clutter components are in amplitude even or inferior with or to Doppler signal components at the center region. Thus the present invention deals with this problem using either one of the following countermeasures.

The countermeasure adds a spatial averaging factor to the equation (5) obtaining instantaneous change amounts in phase of clutter components, that is:

$$\theta_{k,j,i} = \tan^{-1}\left[\sum_{kk=k-K}^{k+K}\sum_{jj=j-J}^{j+J}\sum_{ii=i-I}^{i+I} Z_{kk,jj,ii+1}Z^*_{kk,jj,ii}\right] \qquad (8)$$

k, j, and i are subscripts representing the number of scanning lines, the number of pixels in each scanning line, and the number of data at each pixel position (refer to FIG. 3). The averaging widths in the three directions are "2K+1", "2J+1", and "2I+1".

In general, clutter components are larger in amplitude than Doppler signal components from blood flows. Thus when clutter components bleeds from the outside of the vessels into their inner space undergoing averaging, the clutter components are dominant over estimated phase change amounts. Thus weighting processing which uses weighting coefficients can be used in the spatial averaging. More practical weighting coefficients are, for example, such that the coefficients are small at the ends of a spatial averaging range, and get larger toward the center thereof. The resultant averaged value is used as a phase correction value at the center of the spatial averaging range.

The second countermeasure is a method that adjusts phase correction amounts calculated using equations (5), (6), or (7) in agreement with power values of Doppler signals. The adjustment is carried out by the following equation:

$$\theta_i k(p) \qquad (9)$$

where p is a power value of an inputted Doppler signal and k(p) is a coefficient.

Figure 7:
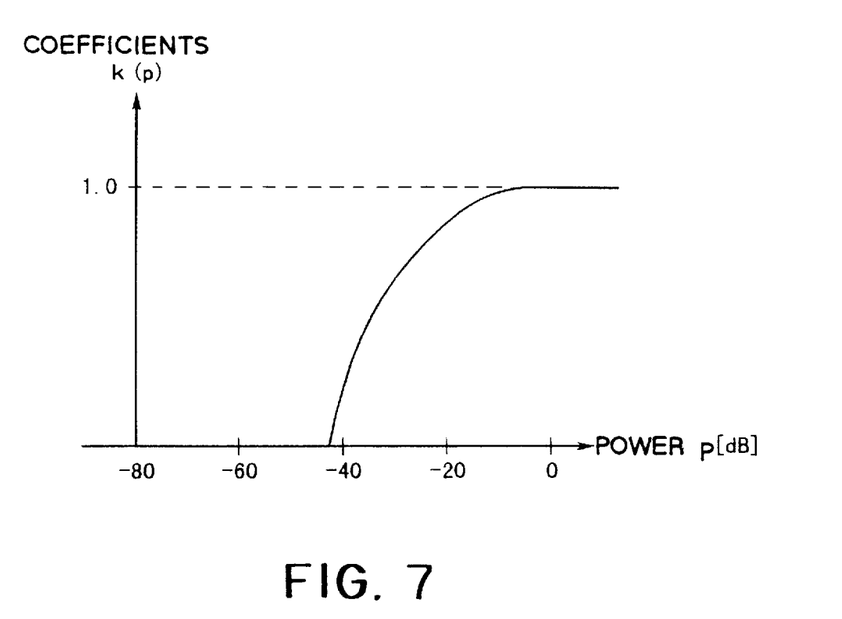
FIG. 7 is a graph showing a relation between signal power and coefficients in relation to one countermeasure against preventing influences of clutter components for a blood vessel of large diameter.

The coefficient k(p) is a main factor for this adjustment, which is exemplified in FIG. 7. Specifically, a range that has very large clutter components (a range of k(p)=1), such as the outside of a blood vessel, is not subject to the adjustment of phase correction amounts. On one hand, inside the vessel, the coefficient k(p) to be multiplied for phase correction amounts are gradually smaller as the inputted signal into the MTI filter unit get smaller. As a result, as in the center range of a vessel with less clutter components and with phase correction amounts influenced greatly by the velocities of blood flows, the coefficient k(p) becomes smaller and the degrees of phase correction are lowered. The control of the coefficient is also rational in removing clutter components. That is, since clutter components are originally less inside a thick vessel, there is less necessity that enhances removal performance of clutter components using techniques of the present invention.

The above first and second countermeasures can practiced solely or in combination. The combined countermeasures have lager advantages.

In the invention, based on instantaneous phase change amounts $Q_i$ obtained by performing one or more of the above various averaging techniques (or combined with one or more of the above countermeasures), clutter components are removed by calculation given by the following equation:

$$Z_i \cdot exp\{-j(\theta_1+\theta_2+\ldots+\theta_{i-1})\} - A \cdot exp\{j(\phi_0)\} \quad (10)$$

The equation (10) has the first term representing a complex multiplication for phase correction using phase estimations of clutter components, and the second term representing a subtraction of a constant value (the first value existing in a train of Doppler data) for the removal of clutter components.

The clutter phase change amount estimator 45a performs a calculation described in equation (5), (6), (7), (8) improved from (4), or (9) improved from (5), (6), or (7), with the result that a instantaneous phase change amount $Q_i$ of clutter components is estimated. Using a instantaneous phase change amount estimated by the estimator at the current sampling time and ones which had already been estimated by the estimator at the previous sampling times, the multiplication signal generator 45b generates a complex multiplication signal as follows.

$$exp\{-j \cdot (\theta_1+\theta_2+\ldots+\theta_{i-1})\}$$

The multiplication signal is sent to the complex multiplier 45c. To the multiplier 45c are provided digital Doppler signals $Z_i$ of each of the real and imaginary parts. Thus a complex multiplication between the signals $Z_i$ and the complex multiplication signal is carried out by the multiplier 45c as follows.

$$Z_i \cdot exp\{-j \cdot (\theta_1+\theta_2+\ldots+\theta_{i-1})\}$$

Assume that a Doppler signal of the imaginary part I inputted into the MTI filter unit 45 can be illustrated as shown in FIG. 4A. This wave form of the signal consists of Doppler shift components of clutter components, which has larger amplitudes and slower velocities, on which Doppler shift components from blood flows are superposed, which varies with smaller amplitudes (they are difficult to clearly be shown in the figure). Performing the phase correction based on instantaneous phase change amounts of clutter components for the wave of FIG. 4A produces a wave form illustrated in FIG. 4B, where ups and downs with large amplitudes and slower velocities caused by clutter components are steadily removed, providing a wave form which can be regarded as an approximate constant wave form, the varying components of which are almost made up of Doppler shifts from blood flows.

As the next stage, the subtraction shown by the second term of equation (10) is carried out by the constant-value subtracter 45d. In other words, an amplitude "$A \cdot exp\{j \cdot \phi_0\}$" at the first phase $\phi_0$, which can be regarded as an amplitude of clutter components, is subtracted from the Doppler signal from which instantaneous phase changes corresponding to clutter components have been removed. This subtraction is shown by transitions from FIG. 4B to FIG. 4C. As can be seen, the absolute amplitude is reduced to the zero or thereabout level after the subtraction, showing a preferred result of removal of clutter components.

A constant value used in the subtacter 45d can have various values; for example, an arbitrary value residing in a train of N-piece Doppler data can be used or an average over the N-piece Doppler data can be used.

Although the subtraction of a constant value in the second term of equation (10) is for removing clutter components, this subtraction is not necessarily required when high-pass filtering will be carried out at the output stage of the subtracter 45d. Even if that is true, as described below, when controlling the cut-off characteristics of a high-pass filer according to the nature of a Doppler signal, which also forms another feature of the present invention, the subtraction of a constant value and its relevant processing carried out by units 45a to 45c are necessary, because the results of equation (10) is utilized as information for controlling the characteristics.

Figure 8:
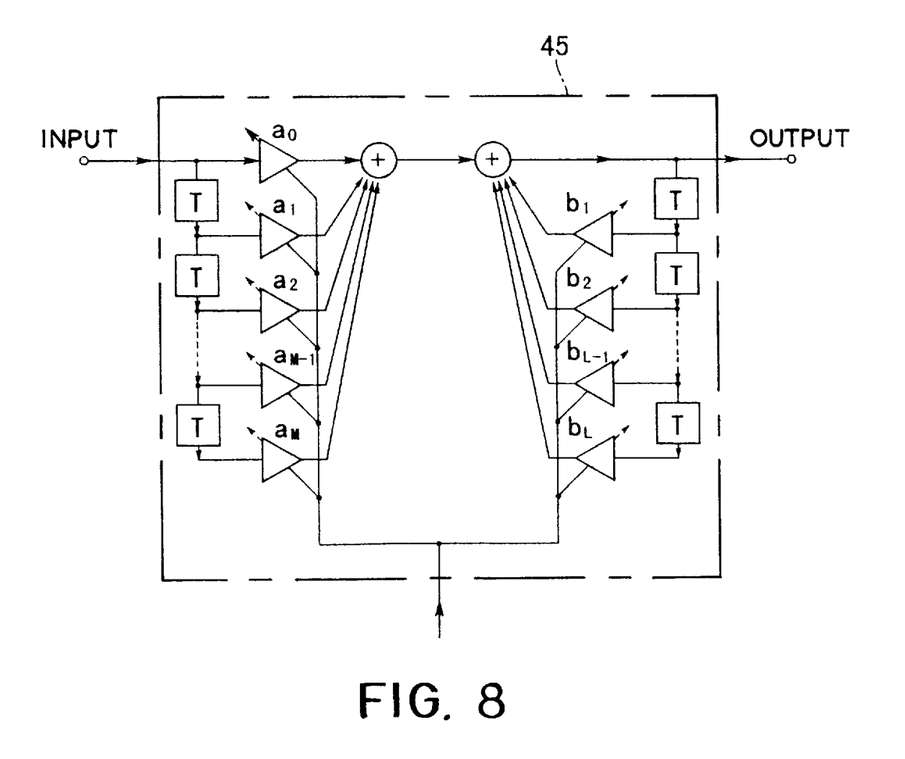
FIG. 8 is one example of configuration of a high-pass filter.

Another feature (3) concerning the MTI filter unit 45 will now be described. To realize the feature, the MTI filer unit 45, as shown in FIG. 2, comprises not only a high-pass filter 45g and a clutter information detector 45e both receiving the output signal of the constant-value subtracter 45d but also a filter characteristic setting unit 45f receiving an output of the detector 45e to control the cut-off characteristics of the high-pass filer 45e. The high-pass filter 45e, which can be formed into an FIR type or IIR type, is constructed such that high-pass filtering can be performed according to the number of orders and cut-off frequencies set by the setting unit 45f. FIG. 8 shows one example of high-pass filters (in the figure, a configuration for either one of the real or imaginary part is shown).

The feature (3) is provided on the following reasons. In the curve shown in FIG. 4C, it may be considered that the clutter components have been removed and only the Doppler signal from blood flows remains. Actually, however, there is a certain limit in estimation accuracy even when instantaneous phase change amounts of clutter components are estimated as explained above. Therefore, there may be some situations that clutter components still remain to some extent in the output signal only when equation (10) is applied. The remaining clutter components will be further removed by the high-pass filter in this embodiment, the cut-off characteristics of which being adaptively controlled.

Specifically, the cut-off characteristics of the high-pass filter 45g is controlled in agreement with inherence of Doppler signals after their clutter components have been removed by subtraction of a constant value. As information for finding inherence of Doppler signals, power values and dispersion values are each calculated as follows utilizing the outcome of equation (10).

$$\text{Power values} = (1/N)\sum_{i=0}^{N-1} Z_i Z_i^* \quad (11)$$

$$\text{Dispersion values} = 1 - \frac{\left|(1/(N-1))\sum_{i=0}^{N-2} Z_{i+1}Z_i^*\right|}{\left\{(1/N)\sum_{i=0}^{N-1} Z_i Z_i^*\right\}} \quad (12)$$

Depending on the power values and/or dispersion values, the characteristics of the high-pass filter are set. If amplitude changes in clutter components are relatively small, most of them are removed by processing according to equation (10), providing smaller power values of Doppler signals. In contrast, if the amplitude changes are relatively large, the power values of Doppler signals are also larger. Thus, when the power values are relatively smaller, even though the high-pass filter is set to lower cut-off frequencies, the clutter components are fully removed by the filter. On the contrary, when the power values are relatively larger, setting higher cut-off frequencies of the filter permits a steady removal of clutter components.

Figure 9A:
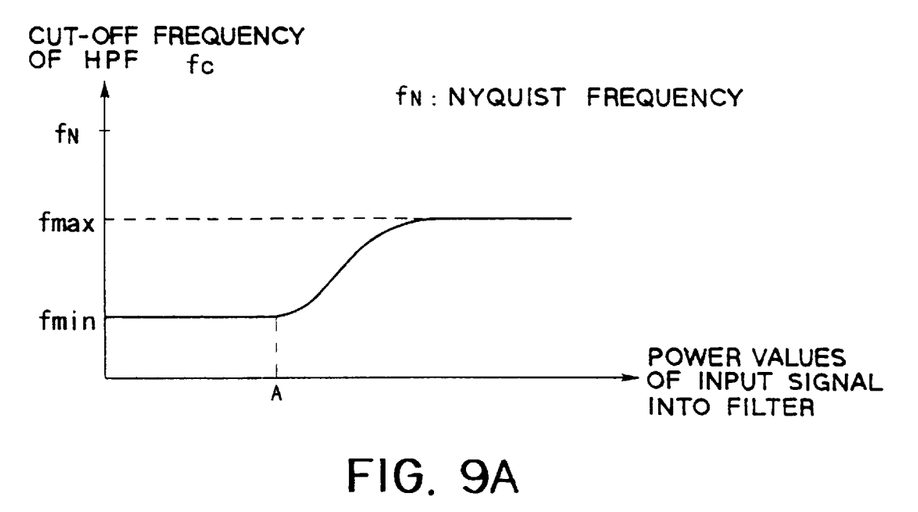
FIGS. 9A and 9B are graphs for explaining the control of cut-off frequencies and bandwidth characteristics each for adaptive control of cut-off characteristics of high-pass filters.
Figure 9B:
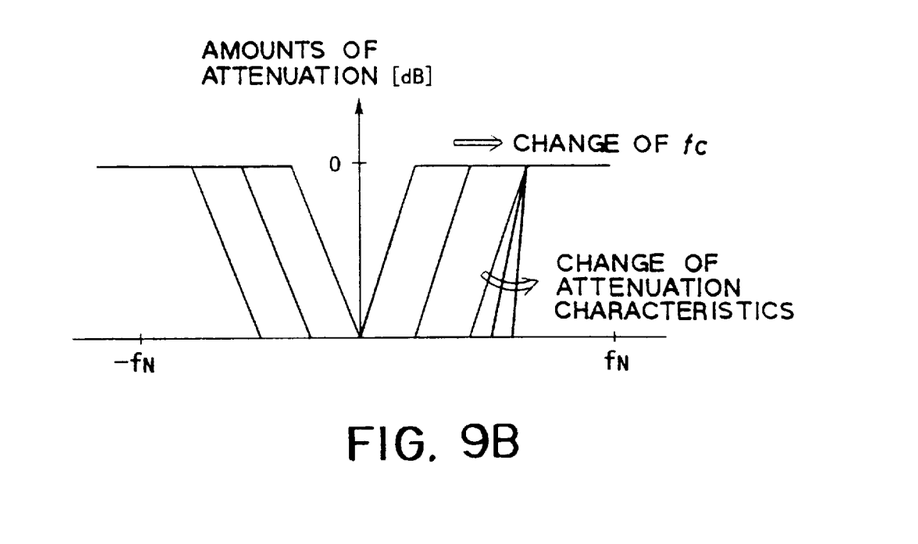

One example of control of the cut-off frequencies based on the power values is shown in FIG. 9A. Where the power value is less than a certain value, the cut-off frequency is set a pre-given minimum $f_{min}$. As the power values increases, the cut-off frequency $f_c$ is also increased. As shown in FIG. 9B, the number of orders of the filter configuration can be raised so that its attenuation characteristics become steeper, additionally controlling of the cut-off frequency.

The dispersion values can be combined into the power values, as information for controlling the cut-off characteristics. In this case, for the same power values, the cut-off frequency of the high-pass filter is raised as the dispersion values increase, because it can be recognized that the remaining clutter components also spread over a higher frequency band.

According to the above, the Doppler signals of the real and imaginary parts, from which clutter components have been removed at the first stage, are subject to high-pass filtering by the high-pass filter 45g. This high-pass filtering allows the remaining clutter components to be removed more clearly. In particular, the inherence of Doppler signals is determined to adaptively control the characteristics of the high-pass filter 45g as described above. For example, the larger the power values of Doppler signals, the higher the cut-off frequency of the high-pass filter 45g, providing greater removal ability of clutter components by broadening the cut-off frequency band. In contrast, for smaller power values, the cut-off frequency is lowered to enhance the pass of Doppler signal components from blood flows, because it can be assumed that the clutter components have already been almost completely removed.

Furthermore, the feature (4) of the MTI filter unit 45 will now be described. As shown in FIG. 2, the MTI filter unit 45 has a complex multiplier 45i at the output stage of the high-pass filter 45g. To the multiplier 45i is provided from a phase reversing unit 45h a phase reversing signal. The reversing unit 45h receives an output signal of the foregoing multiplication signal generator 45b and performs phase reversing processing as below.

The object of this feature (4) is as follows. While clutter components will be surely removed by processing according to the above features (1) to (3), the remaining Doppler signals reflected from blood flows have been phase-shifted by $\phi_i$ of phase change amounts of clutter components, as shown in equation (3). The phase values as- phase-shifted could be used to obtain relative blood flow information to clutter components. Namely blood flow velocities compared withorgans (i.e., truevelocities) are obtained. However this type of velocities are different from conventionally-used ones which are compared with the ultrasound probe. Since the blood flow velocities compared with the probe have long been used and are easy to be accepted to examining physicians, the present invention also makes it possible to obtain such blood flow velocities. In order to achieve this, the phase change amounts used in equation (10) are reversed in their signs to operate as follows. When Doppler signals are $S_i$ outputted from the high-pass filter 45g, the processing of $$S_i \cdot exp\{+j(\theta_1+\theta_2+\ldots+\theta_{i-1})\} \quad (13)$$

is carried out to obtain blood flow velocities to the probe.

More specifically, the phase reversing unit 45h executes a phase reversing calculation of $$+j(\theta_1+\theta_2+\ldots+\theta_{i-1}) \quad (14)$$

to produce complex signals representing the phase reverse of the phase correction amounts, which are then sent to the multiplier 45i. By the multiplier 45i, the Doppler signals from which clutter components have been removed by the high-pass filter 45g are multiplied by their phase-reversed signals. This multiplication cancels out influences of the phase correction for clutter components and produces signals from which blood flow velocities to the probe are available. If blood flow velocities compared with tissues are estimated and displayed, such phase reversal and multiplication are not necessary.

The Doppler signals processed by the MTI filter unit 45 in the above various manner are sent to the calculation unit 46, where information of blood flows such as blood flow velocities, power values of the signals, and dispersion values of velocity distribution are calculated. The calculated information are color-displayed on the TV monitor 34 in appropriate manners.

In the embodiment, even if tissues is in motion due to the heart beat, breathing, and others, clutter components reflected from such tissues are steadily and accurately removed, efficiently extracting Doppler signals most of which are reflected from only flows of blood. In particular, timely correction (cancellation) of changes in phase of clutter components is carried out using amounts of instantaneous changes in phase, which is shorter in time than an observation period of a Doppler signal. Thus compared with the phase correction technique which uses only one common amount of phase correction over the observation period, accuracy in phase correction is noticeably raised. By this correction, clutter components of a substantially constant amplitude (on which Doppler signals from blood flows are superposed) can be extracted, which is extremely superior to the conventional method in removal of clutter components carried out later by subtracting a constant value from the Doppler signal. In this way, as pre-processing, only clutter components are distinguishably removed utilizing inherence owned by Doppler signals. Therefore, even for slower velocities of flows of blood, Doppler signals from flows of blood, which are hidden in clutter components, are extracted in a more steady manner, providing a remarkable detectability of slower velocities of flows of blood. Thus the present invention is effective in providing images of flows of blood capable of raising reliability and diagnosis.

Further, even when slight amounts of clutter components still remain after such removal, the high-pass filter is effective and removes such residuals almost completely. Additionally the cut-off characteristics of the high-pass filter are adaptively controlled in agreement with the power values of Doppler signals input into the high-pass filter. It is possible to select either one of still retaining a high removal ability of clutter components, or further enhancing a filtering ability of Doppler signals for blood flows. The cut-off characteristics are preferably controlled. Thus even for changed inherence of clutter components, it is possible to have a high and stable removal performance of removal for clutter components, thereby greatly enhancing display performance of blood flows.

A second embodiment of the present invention will now be described in conjunction with FIG. 10.

Figure 10:
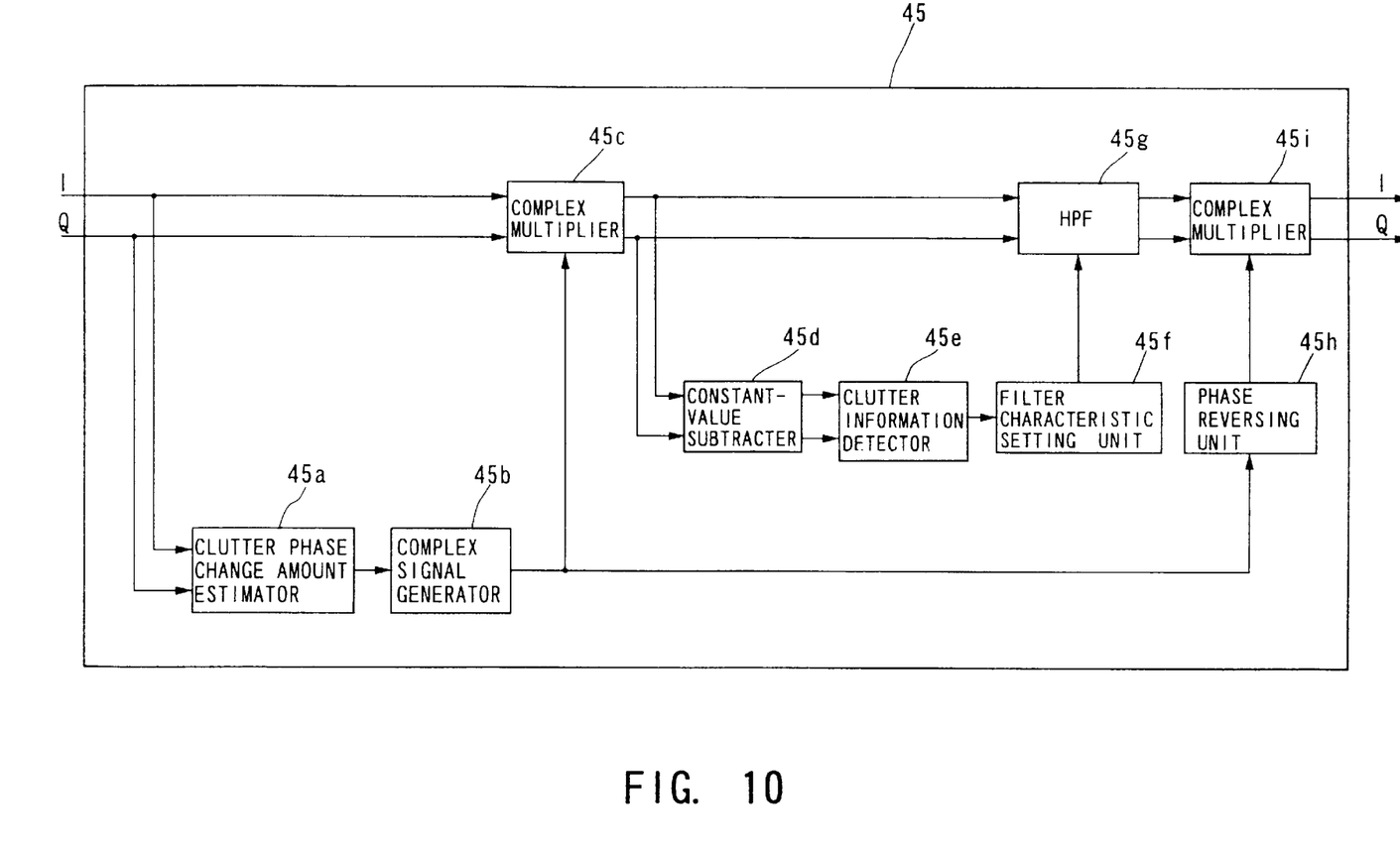
FIG. 10 is a block diagram of the MTI filter unit according to a second embodiment.

FIG. 10 shows the block diagram of the MTI filter unit 45 employed by a color-Doppler type diagnostic ultrasound apparatus of the second embodiment. The other components of the apparatus are the same or similar as or to that of the first embodiment.

As shown therein, the MTI filter unit 45 has the high-pass filter 45g directly connected to the output of the first-stage complex multiplier 45c, not to the constant-value subtracter 45d as in the first embodiment. As a result, Doppler signals of which clutter components have been phase-corrected are directly sent to the high-pass filter 45g, where the clutter components are corrected. In the same manner as in the first embodiment, the cut-off characteristics of the high-pass filter 45g are controlled based on the Doppler signals from which constant values are subtracted (i.e., clutter components are removed).

This processing is based on the following reason. Of the terms shown in equation (10), the second term representing the subtraction of constant values becomes equivalent to the processing of cutting DC components in cases where the phase-corrected signal curve in FIG. 4B becomes approximately flat. In such cases, if the high-pass filter 45g is arranged in the second stage as in FIG. 10, the filter can perform the cutting of DC components together with high-pass filtering. Therefore, it is not necessary to have a constant-value subtracter before the high-pass filter.

Hence as shown in FIG. 10, the constant-value subtraction for Doppler signals can be omitted and its circuit can only be inserted for determining inherence of clutter components. This variation of circuitry can broaden the choice of circuitry design.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What we claim is:

1. A diagnostic ultrasound color-Doppler apparatus comprising:

transmitting/receiving means for transmitting an ultrasound signal a plurality of times in each scanning direction in a cross section to be imaged of an object and receiving an ultrasound echo reflected from the cross section of the object;

means for detecting a Doppler signal from a group of echo signals made up of the ultrasound echo received at each time of the plurality of times of the transmission, the Doppler signal consisting of a train of sequential Doppler data resulting from each spatial sample position in each scanning direction;

means for estimating an amount of instantaneous change in a phase of a clutter component included in the Doppler signal, the clutter component occurring due to reflection of the ultrasound signal from an organ existing in the cross section;

means for correcting a phase of the Doppler signal using the estimated amount of instantaneous change in the phase:

means for extracting information representing blood flow passing the cross section based on the Doppler signal of which clutter component is corrected by correcting means; and means for displaying the extracted information.

2. The apparatus of claim 1, wherein the displaying means displays the extracted information in color.

3. The apparatus of claim 1, comprising means for subtracting a constant value corresponding to the clutter component from the Doppler signal of which phase is corrected by the correcting means.

4. The apparatus of claim 3, wherein the correcting means comprises means for producing a complex signal for canceling out changes in the phase of the clutter component based on the amount of instantaneous changes in the phase estimated by the estimating means, and means for multiplying the Doppler signal by the produced complex signal.

5. The apparatus of claim 4, comprising means for canceling out the amount of the corrected phase of the Doppler signal multiplied by the multiplying means.

6. The apparatus of claim 5, wherein the canceling means comprises mean for reversing of a sign of the complex signal and means for multiplying the Doppler signal provided from the subtracting means by the sign-reversed complex signal.

7. The apparatus of claim 3, wherein the subtracting means is constructed to employ as the constant value an amplitude of the Doppler data residing at any temporal position in the train of Doppler data.

8. The apparatus of claim 3, wherein the subtracting means is constructed to employ as the constant value an average amplitude over the entire train of Doppler data.

9. The apparatus of claim 3, further comprising a high-pass filter for filtering with changeable cut-off characteristics the Doppler signal from which the constant value is subtracted by the subtracting means, and means for controlling the cut-off characteristics of the high-pass filter in accordance with characteristics of the Doppler signal.

10. The apparatus of claim 9, wherein the controlling means comprises an element calculating as the characteristics of the Doppler signal a power value thereof and an element controlling at least one of a cut-off frequency and an order number of the filter in accordance with the power value.

11. The apparatus of claim 1, wherein the estimating means is means for estimating the amount of instantaneous changes in the phase using only part of the train of Doppler data.

12. The apparatus of claim 11, wherein the estimating means comprises means for estimating the amount of instantaneous changes in the phase by performing calculation including complex conjugate multiplication for temporal-contiguous Doppler data employed as the part of the train of Doppler data.

13. The apparatus of claim 11, wherein the estimating means comprises means for estimating the amount of instantaneous changes in the phase on the basis of a characteristic of a plurality of Doppler data averaged over a plurality of spatially contiguous samples and employed as the part of the train of Doppler data.

14. The apparatus of claim 1, wherein the estimating means includes means for correcting the amount of instantaneous changes in the phase in accordance with a power value of the entire train of Doppler data sampled from each spatial sample position in each scanning direction.

15. The apparatus of claim 1, further comprising a high-pass filter for filtering with changeable cut-off characteristics the Doppler signal phase-corrected by the phase correcting means and means for controlling the cut-off characteristics in agreement with characteristics of the Doppler signal.

16. The apparatus of claim 15, wherein the controlling means comprises an element calculating as the characteristics of the Doppler signal a power value thereof and an element controlling at least one of a cut-off frequency and an order number of the filter in accordance with the power value.

17. The apparatus of claim 1, further comprising a filter for filtering with changeable cut-off characteristics the Doppler signal and means for controlling the cut-off characteristics in agreement with characteristics of the Doppler signal.

18. A method of ultrasound imaging, comprising the steps of:

transmitting an ultrasound signal a plurality of times in each scanning direction in a cross section to be imaged of an object and receiving an ultrasound echo reflected from the cross section of the object;

detecting a Doppler signal from a group of echo signals made up of the ultrasound echo received at each time of the plurality of times of the transmission, the Doppler signal consisting of a train of sequential Doppler data resulting from each spatial sample position in each scanning direction;

estimating an amount of instantaneous changes in a phase of a clutter component included in the Doppler signal, the clutter component occurring due to reflection of the ultrasound signal from an organ existing in a cross section;

correcting a phase of the Doppler signal using the estimated amount of instantaneous changes in the phase;

subtracting a constant value corresponding to the clutter component from the Doppler signal of which phase is corrected;

extracting information representing blood flow passing the cross section based on the Doppler signal of which clutter component is removed by the subtraction; and displaying the extracted information.

19. The method of claim 18, wherein the correcting step comprises filtering the Doppler signal with a filter having changeable cut-off characteristics controlled in agreement with characteristics of the Doppler signal.

* * * * *